(12) United States Patent
Amarilio et al.

(10) Patent No.: US 10,656,725 B2
(45) Date of Patent: May 19, 2020

(54) CHANGING KEYBOARD LIGHTING BEFORE USER GOES TO SLEEP

(71) Applicant: GOOGLE LLC, Mountain View, CA (US)

(72) Inventors: Omri Amarilio, Palo Alto, CA (US); Katie Leah Roberts-Hoffman, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/794,353

(22) Filed: Oct. 26, 2017

(65) Prior Publication Data

US 2018/0136737 A1 May 17, 2018

Related U.S. Application Data

(60) Provisional application No. 62/423,554, filed on Nov. 17, 2016.

(51) Int. Cl.

| *G06F 1/16* | (2006.01) |
| *G06F 3/02* | (2006.01) |
| *H04M 1/22* | (2006.01) |
| *H05B 45/10* | (2020.01) |
| *H05B 45/20* | (2020.01) |
| *H05B 47/16* | (2020.01) |
| *H05B 47/105* | (2020.01) |
| *H01H 13/83* | (2006.01) |

(52) U.S. Cl.
CPC ........... *G06F 3/0202* (2013.01); *H01H 13/83* (2013.01); *H04M 1/22* (2013.01); *H05B 45/10* (2020.01); *H05B 45/20* (2020.01); *H05B 47/105* (2020.01); *H05B 47/16* (2020.01); *H01H 2219/036* (2013.01); *H01H 2219/038* (2013.01); *H01H 2219/039* (2013.01); *Y02B 20/42* (2013.01)

(58) Field of Classification Search
None
See application file for complete search history.

(56) References Cited

U.S. PATENT DOCUMENTS

| 9,183,812 | B2 | 11/2015 | Myers et al. |
| 2005/0041139 | A1 | 2/2005 | Lowles |
| 2005/0051708 | A1 | 3/2005 | Hotelling |
| 2006/0152525 | A1* | 7/2006 | Woog ..................... G09G 5/003 |
| | | | 345/589 |

(Continued)

FOREIGN PATENT DOCUMENTS

WO 2016089930 A1 6/2016

OTHER PUBLICATIONS

Invitation to Pay Additional Fees for International Application No. PCT/US2017/059003, dated Feb. 13, 2018, 13 pages.

(Continued)

*Primary Examiner* — Parul H Gupta
(74) *Attorney, Agent, or Firm* — Brake Hughes Bellermann LLP

(57) ABSTRACT

A keyboard may include a plurality of keys, at least one light source configured to illuminate the plurality of keys, and a controller. The controller may be configured to control a color and/or an intensity of light emitted by the at least one light source based on a time of day and/or a type of an application running on a computing system receiving input from the keyboard.

20 Claims, 8 Drawing Sheets

(56) References Cited

U.S. PATENT DOCUMENTS

| | | | |
|---|---|---|---|
| 2008/0158134 A1* | 7/2008 | Luo | G06F 3/0238 345/102 |
| 2009/0128567 A1* | 5/2009 | Shuster | G06T 13/40 345/473 |
| 2009/0192704 A1 | 7/2009 | Geelen | |
| 2009/0285056 A1* | 11/2009 | Scott | G04G 9/0076 368/21 |
| 2010/0085841 A1* | 4/2010 | Lazaridis | G04G 11/00 368/73 |
| 2011/0006686 A1 | 1/2011 | Chen et al. | |
| 2011/0015495 A1* | 1/2011 | Dothie | A47C 31/123 600/300 |
| 2011/0084614 A1* | 4/2011 | Eisele | H05B 47/11 315/152 |
| 2012/0004511 A1* | 1/2012 | Sivadas | H04N 1/00307 600/300 |
| 2013/0208576 A1* | 8/2013 | Loree, IV | G04G 11/00 368/256 |
| 2014/0052220 A1* | 2/2014 | Pedersen | A61N 5/0618 607/88 |
| 2014/0106821 A1 | 4/2014 | Nakahara | |
| 2016/0154481 A1 | 6/2016 | Sallas et al. | |

OTHER PUBLICATIONS

International Search Report and Written Opinion for International Application PCT/US2017/059003, dated Apr. 20, 2018, 19 pages.
Written Opinion for PCT Application No. PCT/US2017/059003, dated Aug. 31, 2018, 11 pages.
International Preliminary Report on Patentability for International Application No. PCT/US2017/059003, dated Nov. 26, 2018, 21 pages.

* cited by examiner

CHANGING KEYBOARD LIGHTING BEFORE USER GOES TO SLEEP

CROSS REFERENCE TO RELATED APPLICATION

This application claims priority to U.S. Application No. 62/423,554, filed Nov. 17, 2016, the disclosure of which is incorporated herein by reference in its entirety.

TECHNICAL FIELD

This description relates to keyboard lighting for computing systems.

BACKGROUND

Keyboards may enable a user to provide character input into computing systems. The keyboards may include one or more backlights to illuminate the keys. Illuminating the keys may assist the user in seeing the keys, improving accuracy of typing. However, illumination by white light may make it difficult for the user to fall asleep shortly after using the computing system.

SUMMARY

According to an example, a keyboard may include a plurality of keys, at least one light source configured to illuminate the plurality of keys, and a controller. The controller may be configured to control a color and/or an intensity of light emitted by the at least one light source based on a time of day and a type of an application running on a computing system receiving input from the keyboard.

According to another example, a keyboard may include at least a first key and a second key, at least a first light source configured to illuminate the first key and a second light source configured to illuminate the second key, and a controller. The controller may be configured to cause an intensity of light emitted by the first light source to be greater than an intensity of light emitted by the second light source based on an application running on a computing system receiving input from the keyboard.

According to an example, a method may include determining, by a computing system, a time of day and/or determining a type of application running on the computing system, determining, based on the time of day and/or the type of application running on the computing system, that a user of the computing system is likely to go to sleep soon, reducing an intensity of light source for a keyboard based on the determining that the user is likely to go to sleep soon, and reducing contributions of colors, other than blue, by the light source for the keyboard based on the determining that the user is likely to go to sleep soon.

The details of one or more implementations are set forth in the accompanying drawings and the description below. Other features will be apparent from the description and drawings, and from the claims.

DETAILED DESCRIPTION

A keyboard may change the keyboard lighting by reducing the intensity and/or contributions of non-blue colors at times when the keyboard and/or computing system predicts that the user is likely to go to sleep soon. Non-blue colors, such as red and green, which combine with blue to produce white light, may make it difficult for a user to fall asleep. Reducing the intensity of these non-blue colors, such as by shifting the color from white to yellow and then blue, and/or the intensity of the light, before the user goes to sleep, may make it easier for a user to fall asleep shortly after using the keyboard.

The keyboard and/or computing system may process various signals to determine that the user is likely to go to sleep soon, and, based on this determination, reduce the intensity of the keyboard backlighting and/or reduce the contributions of non-blue colors by the keyboard backlighting. The keyboard and/or computing system may consider the time of day, an application and/or type of application running on the computing system, and/or a user profile or account associated with the user of the keyboard. For example, the keyboard and/or computing system may determine that the user is likely to go to sleep soon based on the time of day being evening (such as later than eight o'clock at night (8 pm) or some other time based either on the user's profile or independent of the user's profile). In another example, the keyboard and/or computing system may determine that the user is likely to go to sleep soon based on a leisure application running on the computing system instead of a productivity application running on the computing system. In another example, the keyboard and/or computing system may determine that the user is likely to go to sleep soon based on a user account associated with the user being a personal account rather than a work account, and/or based on a user profile associated with the user indicating predicted sleep patterns.

In some implementations, the keyboard may also increase an intensity of light and/or contributions by non-blue colors based on a typing pattern of the user and/or frequency of input into the keyboard. For example, if the user is typing at a slow rate, the keyboard and/or computing system may determine that the user is having difficulty seeing the keys based on the user typing slowly into the keyboard, and may increase the intensity of light and/or increase the contributions by non-blue colors based on the relatively slow typing rate.

Figure 1A:
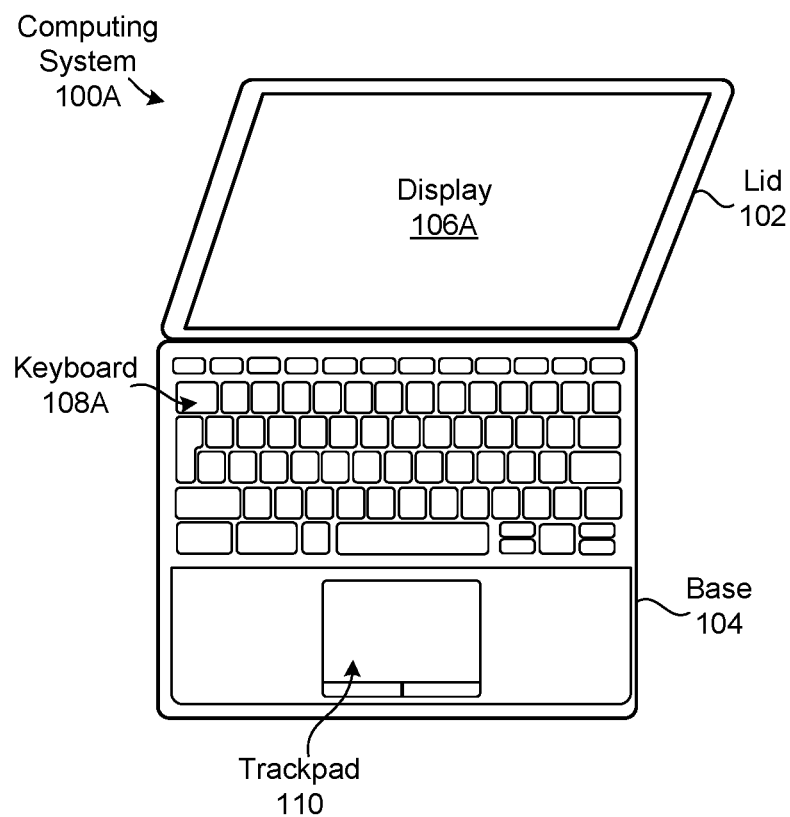
FIG. 1A shows a computing system with a keyboard according to an example embodiment.

FIG. 1A shows a computing system 100A with a keyboard 108A according to an example embodiment. The computing system 100A may receive character input from a user via the keyboard 108A. The keyboard 108A may include multiple keys and/or a plurality of keys, including at least a first key and a second key, that a user may depress to provide character input to the keyboard 108A, and the keyboard 108A may transmit the character input to components of the computing system 100A, such as a processor (not shown in FIG. 1A) of the computing system 100A. The keyboard 108A may include one or more light sources, which may be considered backlights behind or underneath the keys, that illuminate the keys.

In the example shown in FIG. 1A, the computing system 100A may include a laptop or notebook computer. In this example, the computing system 100A may include a lid 102 rotatably attached to a base 104. The lid 102 may include a display 106 that presents graphical output, such as presenting characters that the user has typed into the keyboard 108A. The base 104 may include a trackpad 110 that receives directional input from a user and transmits the directional input to the processor. The base 104 may also include the processor, memory, and other components shown and described with respect to FIG. 6.

Figure 1B:
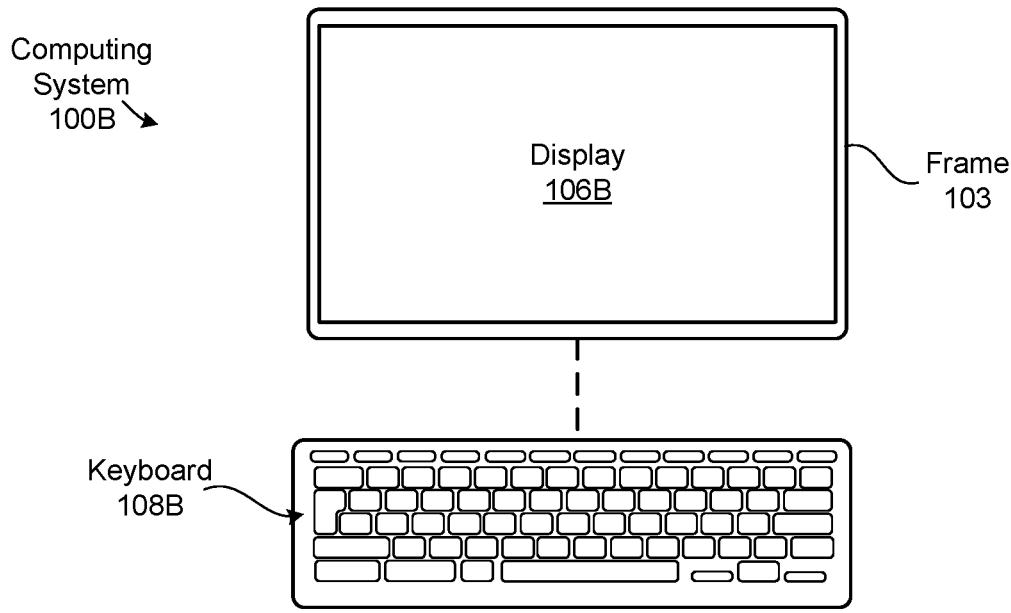
FIG. 1B shows a computing system with a keyboard according to another example embodiment.

FIG. 1B shows a computing system 100B with a keyboard 108B according to another example embodiment. In this example, the computing system 100B may include a desktop or tower computer. The display 106B and keyboard 108B may have similar features and/or functionalities as the display 106A and keyboard 108A respectively described above with respect to FIG. 1A. In this example, the processor and memory may be enclosed by a frame 103 supporting the display 106B, or may be included in a separate component of the computing system 100B.

Figure 1C:
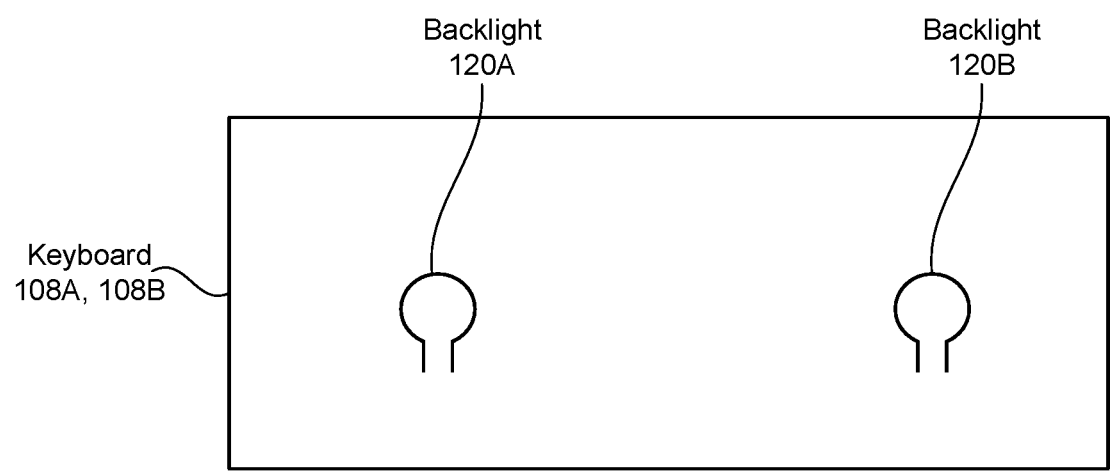
FIG. 1C is a cutaway view showing portions of a keyboard below the keys, with one or more backlights, according to an example embodiment.

FIG. 1C is a cutaway view showing portions of a keyboard 108A, 108B below the keys, including one or more backlights 120A, 120B, according to an example embodiment. The keyboard 108A, 108B may represent either of the keyboards 108A, 108B shown in FIGS. 1A and 1B. The keyboard 108A, 108B may include one or more backlights 120A, 120B, which may be light sources such as light-emitting diodes (LEDs), that emit light to illuminate keys on the keyboard 108A, 108B. In some examples, the backlights 120A, 120B can each include multiple light sources of different colors, such as red, green, and blue, and can vary the relative intensity of each of the differently-colored light sources to project a desired color and/or shade. The keyboard 108A, 108B may control an intensity and/or color spectrum of light emitted by the backlights 120A, 120B. The keyboard 108A, 108B may, for example, control intensities and/or contributions of multiple colors, such as red, green, and blue, or cyan, magenta, and yellow.

FIGS. 2A, 2B, 2C, 2D, and 2E show intensity and color of light emitted by the backlight(s) 120A, 120B (shown in FIG. 1C) as functions of time when various inputs are processed by the keyboard 108A, 108B and/or computing system 100A, 100B. The backlight(s) 120A, 120B may, for example, increase or decrease a number of lumens of light emitted by the backlight(s) 120A, 120B as functions of time. The backlight(s) 120A, 120B may, for example, shift the emitted light from white toward yellow and then blue, and/or reduce contributions of light by colors other than by blue, such as by reducing or eliminating emissions of light with wavelengths greater than five hundred nanometers (500 nm), wavelengths greater than four hundred and ninety-five nanometers (495 nm), wavelengths greater than four hundred and ninety nanometers (490 nm), wavelengths greater than four hundred and eighty-five nanometers (485 nm), and/or wavelengths greater than four hundred and eighty nanometers (480 nm), as non-limiting examples. The reduction in intensity and/or shifting toward blue of the spectrum of the emitted light may help the user to go to sleep shortly after ceasing to use the computing system 100A, 100B. In other examples, the backlight may shift emitted light from white toward yellow and then red, and/or reduce contributions of light by blue, such as by reducing or eliminating emissions of light with wavelengths less than five hundred nanometers (500 nm), wavelengths less than four hundred and ninety-five nanometers (495 nm), wavelengths less than four hundred and ninety nanometers (490 nm), wavelengths less than four hundred and eighty-five nanometers (485 nm), and/or wavelengths less than four hundred and eighty nanometers (480 nm), as non-limiting examples.

Figure 2A:
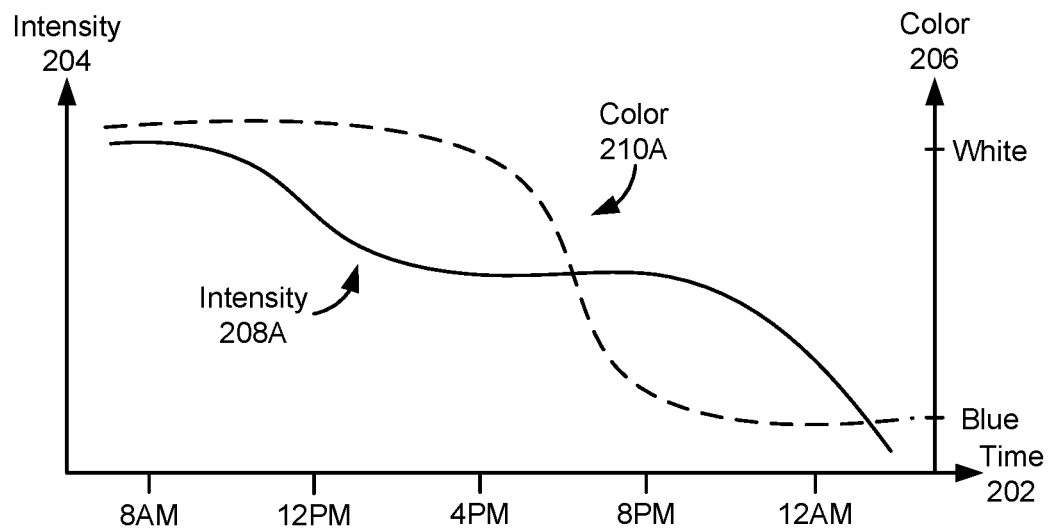
FIG. 2A is a graph showing intensity and color of light emitted by the one or more backlights as functions of time according to an example embodiment.

FIG. 2A is a graph showing intensity 208A and color 210A of light emitted by the one or more backlights 120A, 120B as functions of time 202 according to an example embodiment. As shown in the example of FIG. 2A, the intensity 208A of light emitted by the backlight(s) 120A, 120B may decrease in the evening, such as starting at eight o'clock at night (8 pm), based on a prediction that the later the time is, the more likely the user will sleep soon. The spectrum of the color 210A of the light emitted by the backlight(s) 120A, 120B may also shift toward blue in the evening, reducing contributions by colors other than blue. The reduction of intensity 208A and/or shift of color 210A toward blue light may make it easier for the user to fall asleep after the user stops using the computing system 100A, 100B.

Figure 2B:
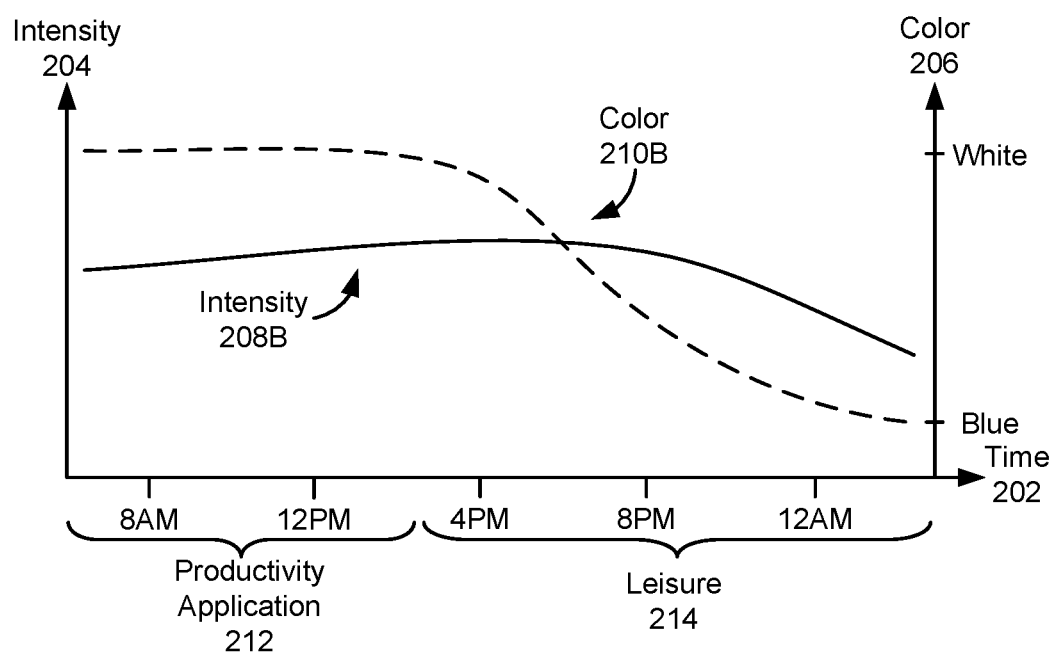
FIG. 2B is a graph showing intensity and color of light emitted by the one or more backlights as functions of an application running on the computing system according to an example embodiment.

FIG. 2B is a graph showing intensity 208B and color 210B of light emitted by the one or more backlights 120A, 120B as functions of an application 216, 218 running on the computing system 100A, 100B according to an example embodiment. In this example, the computing system 100A, 100B may predict the likelihood of a user going to sleep soon based on a type of application running on the computing system 100A, 100B. The computing system 100A, 100B and/or keyboard 108A, 108B may predict that the user is unlikely and/or less likely to go to sleep soon when a productivity application 212, such as a word processing application, a spreadsheet application, or a presentation application, is running on the computing system 100A, 100B. The computing system 100A, 100B and/or keyboard 108A, 108B may predict that the user is more likely to go to sleep soon when a leisure application, such as a music player, video player, gaming application, or web browser, is running on the computing system 100A, 100B. The keyboard 108A, 108B may maintain a moderate to high intensity 208B of light emitted by the backlight(s) 120A, 120B while a productivity application 212 is running on the computing system 100A, 100B, and may reduce the intensity 208B of light emitted when a leisure application 214 begins running on the computing system 100A, 100B.

Figure 2C:
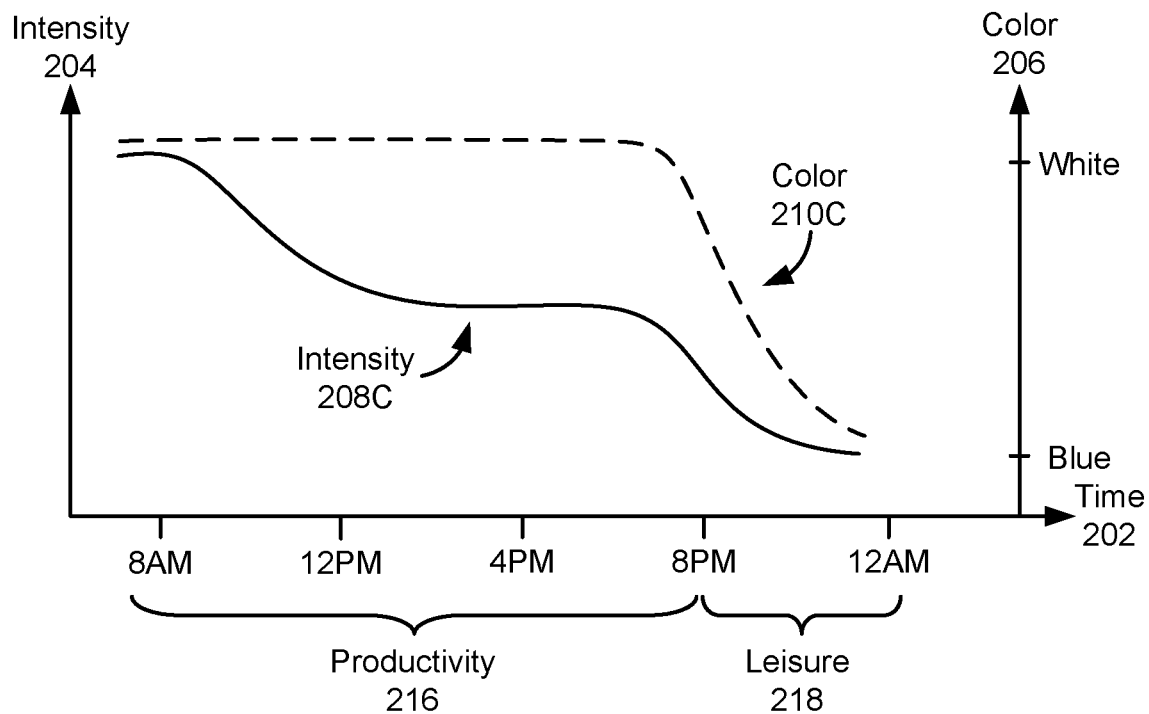
FIG. 2C is a graph showing intensity and color of light emitted by the one or more backlights as functions of time and an application running on the computing system according to an example embodiment.

FIG. 2C is a graph showing intensity 208C and color 210C of light emitted by the one or more backlights 120A, 120B as functions of time 202 and an application 216, 218 running on the computing system 100A, 100B according to an example embodiment. In this example, the intensity 208C may be at a maximum in morning while the user is beginning to use the productivity application 216, and may decrease as afternoon approaches. The intensity 208C may decrease again as the user switches from the productivity application 216 to the leisure application 218. The color 210C may remain white light, with strong contributions from all spectra and/or wavelengths, while the user is using the productivity application 216, and may shift to blue when the user switches to the leisure application 218.

Figure 2D:
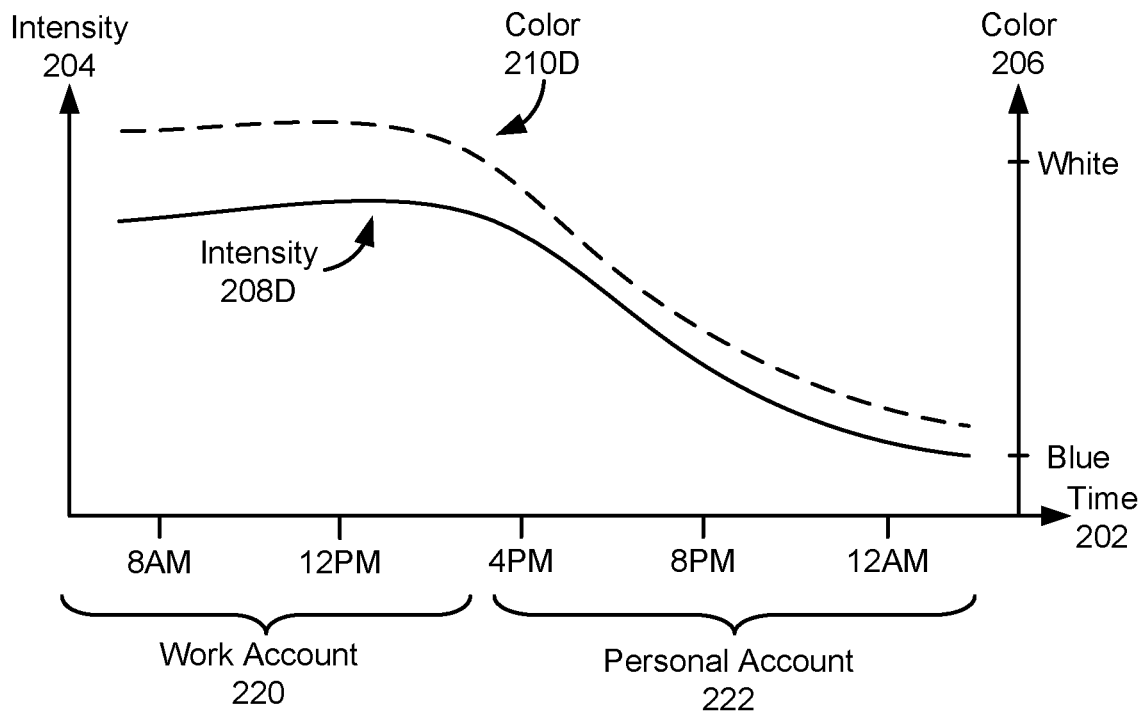
FIG. 2D is a graph showing intensity and color of light emitted by the one or more backlights as functions of a user account using the computing system according to an example embodiment.

FIG. 2D is a graph showing intensity 208D and color 210D of light emitted by the one or more backlights 120A, 120B as functions of a user account 220, 222 using the computing system 100A, 100B according to an example embodiment. A user account 220, 222 may be associated with a user and be used to log into the computing system 100A, 100B and/or to access documents and/or apply settings in the computing system 100A, 100B. The user account 220, 222 may include identification information such as a username and authentication information such as a passcode to log into the computing system 100A, 100B. In this example, the backlight(s) 120A, 120B may maintain a high intensity 208D while the user is logged in via a work account 220, and reduce the intensity 208D when the user is logged in via a personal account 222, based on the prediction that the user is more likely to go to sleep soon after accessing the computing system 100A, 100B via his or her personal account 222 than after accessing the computing system 100A, 100B via his or her work account 220.

Figure 2E:
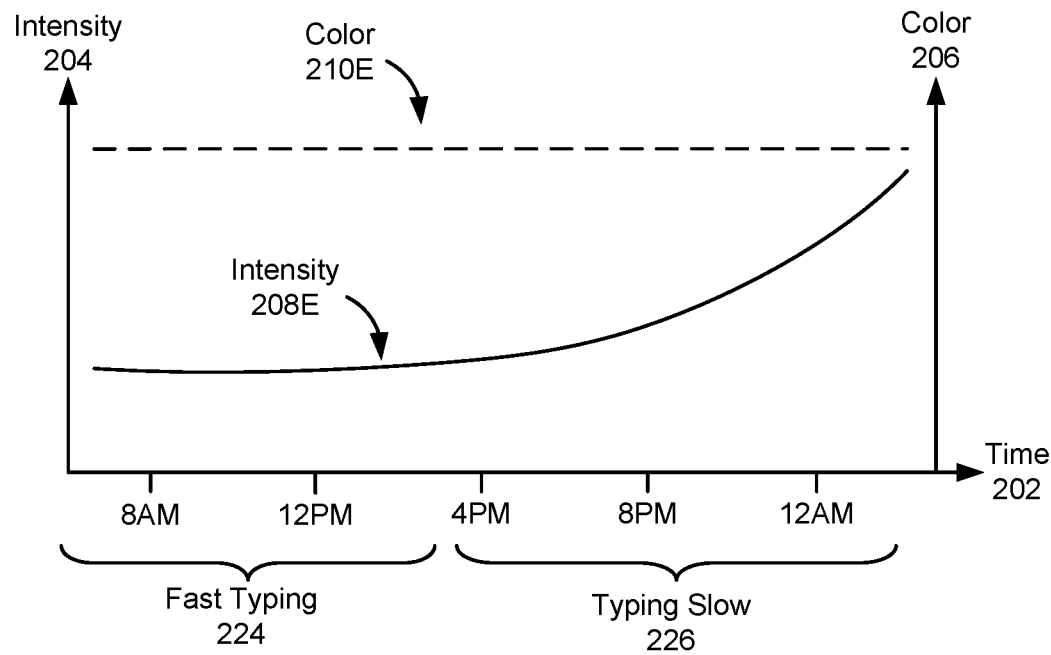
FIG. 2E is a graph showing intensity and color of light emitted by the one or more backlights as functions of typing speed according to an example embodiment.

FIG. 2E is a graph showing intensity 208E and color 210E of light emitted by the one or more backlights 120A, 120B as functions of typing speed according to an example embodiment. The keyboard 108A, 108B and/or computing system 100A, 100B may determine that, when the user is typing slowly, the user is having difficulty seeing the keys on the keyboard 108A, 108B, and that increasing the intensity 208E of the light may be helpful to the user. In this example, the color 210E of the light emitted by the backlight 120A, 120B may remain constant whether the user is typing fast 224 or typing slowly 226. In this example, the backlight(s) 120A, 120B may emit light with low intensity 208E when the keyboard 108A, 108B receives and/or detects fast typing 224, and may increase the intensity 208E when the keyboard 108A, 108B receives and/or detects slow typing 226.

Figure 3:
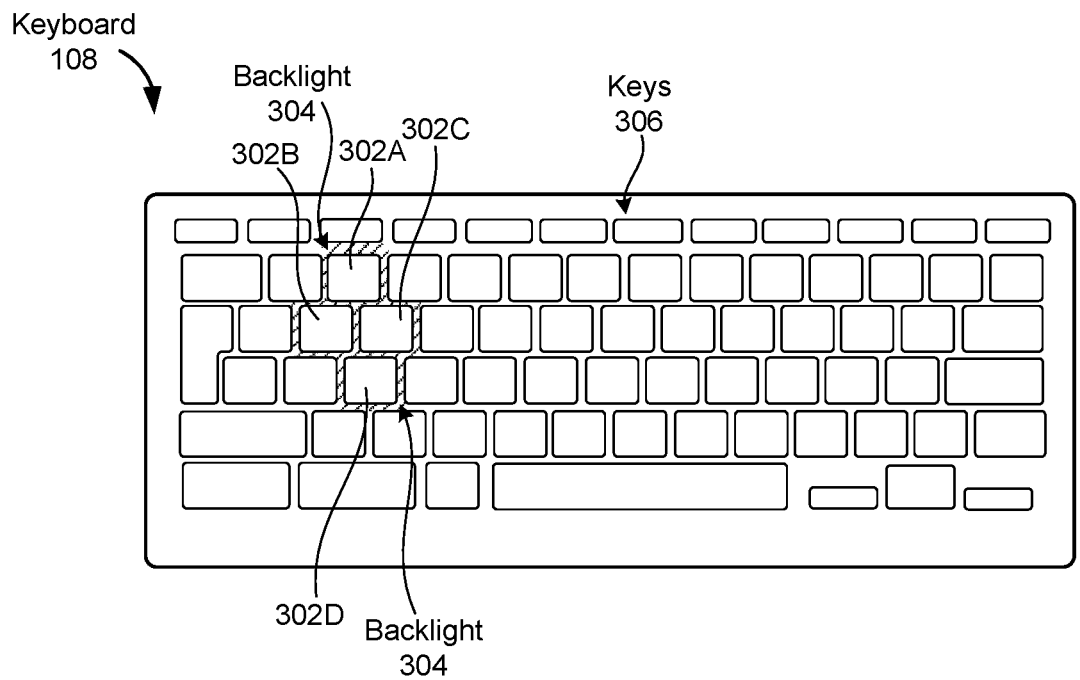
FIG. 3 is a diagram of a keyboard in an example in which intensities of light emitted to illuminate certain keys are greater than intensities of light emitted to illuminate other keys according to an example embodiment.

FIG. 3 is a diagram of a keyboard 108 in an example in which intensities of light emitted to illuminate certain keys 302A, 302B, 302C, 302D are greater than intensities of light emitted to illuminate other keys according to an example embodiment. In this example, the keyboard 108 may represent the keyboard 108A of FIG. 1A and/or the keyboard 108B of FIG. 1B. The computing system 100A, 100B and/or keyboard may determine that certain keys 302A, 302B, 302C, 302D, including at least a first key, are more important and/or will be used more frequently than other keys 306, including at least a second key, on the keyboard 108. Based on the greater importance and/or predicted frequency of use of the keys 302A, 302B, 302C, 302D, the keyboard 108 may increase the intensity of the backlight 304 illuminating the keys 302A, 302B, 302C, 302D compared to the other keys 306 on the keyboard 108. The keyboard 108 may include, for example, at least a first light source (not shown in FIG. 3) configured to illuminate the certain keys 302A, 302B, 302C, 302D and/or the first key with a first intensity, and a second light source (not shown in FIG. 3) configured to illuminate the other keys 306 and/or the second key with a second intensity, the second intensity being less than the first intensity and/or the second light source not illuminating the other keys 206 and/or second key at all. The keyboard 108 and/or computing system 100A, 100B may determine that the certain keys 302A, 302B, 302C, 302D have greater importance than the other keys 306 based on an application running on the computing system 100A, 100B, and/or based on previous typing patterns by the user. In an example in which the application running on the computing system 100A, 100B is an application to teach the user to type, the keyboard 108 may illuminate keys that the user is about to type.

Figure 4:
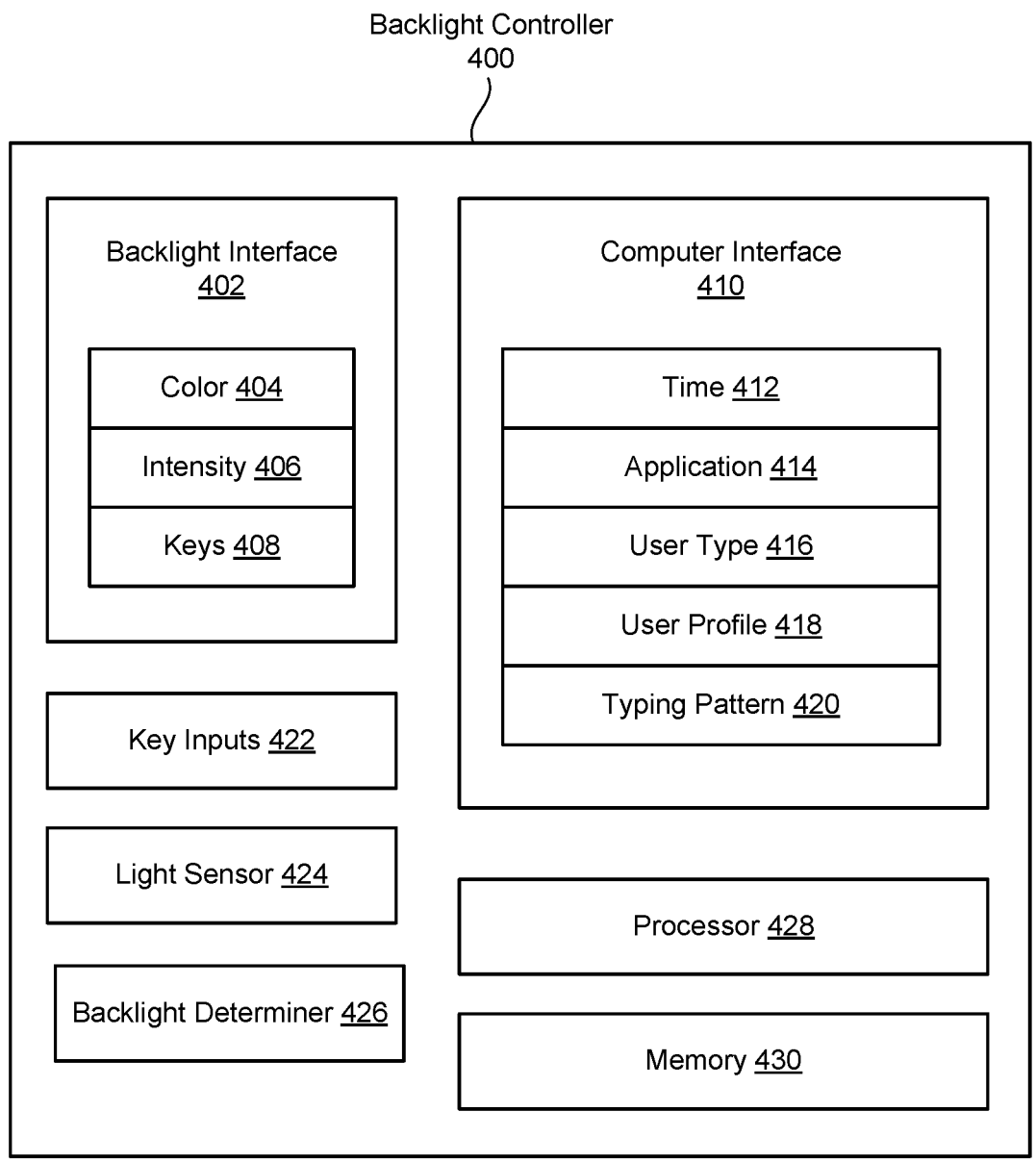
FIG. 4 is a block diagram of a backlight controller according to an example embodiment.

FIG. 4 is a block diagram of a backlight controller 400 according to an example embodiment. The backlight controller 400 may be a controller that is included in the keyboard 108, 108A, 108B, or may be included in another component of the computing system 100A, 100B, according to example embodiments. The backlight controller 400 may control the intensity 208A, 208B, 208C, 208D, 208E (referred to hereinafter as intensity 208) and/or color 210A, 210B, 210C, 210D, 210E (referred to hereinafter as color 210) of the backlight(s) 120A, 120B based on inputs and/or signals such as time of day, application(s) running on the computing system 100A, 100B, user profile and/or user account logged into the computing system 100A, 100B, and/or a typing pattern or typing speed of input into the keyboard 108, 108A, 108B.

The backlight controller 400 may include a backlight interface 402. The backlight interface 402 may provide input and/or control signals to the backlight(s) 120A, 120B. The backlight interface 402 may include a color node 404 that controls the color 210 emitted by the backlight(s) 120A, 120B and/or the spectra of allowed wavelengths of light emitted by the backlight(s) 120A, 120B. The backlight interface 402 may include an intensity node 406 that controls the intensity and/or luminosity of light emitted by the backlight(s) 120A, 120B. The backlight interface 402 may include a key(s) node 408 that controls the intensity of light emitted by backlight(s) 120A, 120B illuminating specific keys 302A, 302B, 302C, 302D in an example in which the backlight(s) 120A, 120B illuminates certain keys 302A, 302B, 302C, 302D with greater intensity than other keys 306 on the keyboard 108.

The backlight controller 400 may include a computer interface 410. The computer interface 410 may receive inputs and/or signals from the computing system 100A, 100B, based on which the backlight interface 402 controls the color 210 and/or intensity 208 of light emitted by the backlight(s) 120A, 120B. The computer interface 410 may receive the inputs and/or signals from the computing system 100A, 100B via a single interface such as a wire, bus, or wireless interface, or multiple interfaces.

The computer interface 410 may receive time input 412 from the computing system 100A, 100B. The time input 412 may include a time of day, a day of the week, a day of the month, a day of the year, and/or a relative time and/or date with respect to some event.

The computer interface 410 may receive application input 414 from the computing system 100A, 100B. The application input 414 may describe a general type of application, such as an application identified as a productivity application or an application identified as a leisure application, or a specific type of application, such as a word processing application, a spreadsheet application, a presentation application, a music player, a video player, a game application, or a browser application, as non-limiting examples.

The computer interface 410 may receive user type input 416 from the computing system 100A, 100B. The user type input 416 may describe a type of user or account logged into and/or using the computing system 100A, 100B such as a work account or a personal account.

The computer interface 410 may receive user profile input 418 from the computing system 100A, 100B. The user profile input 418 may include predictions of when the user will log off the computing system 100A, 100B and/or go to sleep, or when the user is likely to need assistance typing such as brighter and/or more intense backlighting.

The computer interface 410 may receive typing pattern input 420 from the computing system 100A, 100B, or directly from the keys (as described below with reference to key inputs 422). The typing pattern input 420 may include a speed of typing, frequency of typing mistakes, and/or frequency of inputting certain keys 302A, 302B, 302C, 302D. Frequency of imputing certain keys 302A, 302B, 302C, 302D may be in absolute terms or relative to common frequencies of inputs of those keys 302A, 302B, 302C, 302D.

In an example in which the backlight controller 400 determines typing speed and/or typing patterns directly based on input from the keys and/or keyboard 108, 108A, 108B, the backlight controller 400 may include a key input processor 422. The key input processor 422 may receive raw data from the keys and/or keyboard 108, 108A, 108B, such as signals indicating keystrokes, signals indicating which keys were depressed, and/or typing speeds or typing patterns.

The backlight controller 400 may include a light sensor 424. The light sensor 424 may include one or more light sensors, which may include photoresistors, photodiodes, and/or phototransistors. The light sensor 424 may determine ambient lighting conditions around the keyboard 108, 108A, 108B, based on which the backlight controller 400 may adjust the light emitted by the backlight(s) 120A, 120B. For example, if the light sensor 424 determines that the ambient light is bright, then the backlight controller 400 may maintain bright, white light based on the determination that it is daytime and the consequent prediction that the user is unlikely to go to sleep soon. If the light sensor 424 determines that the ambient light is darkening, becoming less bright, and/or is dimming, then the backlight controller 400 may reduce the intensity of light emitted by the backlight(s) 120A, 120B, and/or may shift the spectrum and/or color of light emitted by the backlight(s) 120A, 120B toward blue.

The backlight controller 400 may include a backlight determiner 426. The backlight determiner 426 may determine the intensity 208 and/or color 210 of light for the backlight(s) 120A, 120B to emit, based on which the backlight interface 402 may send color signals, intensity signals, and/or key signals to the keyboard 108, 108A, 108B. The backlight determiner 426 may, for example, determine that the intensity 208 should be increased during daytime hours (and/or hours identified as working hours) and/or decreased during evening hours (and/or hours identified as evening hours). The backlight determiner 426 may, for example, determine that the intensity 208 should be increased when a productivity application 216 is running on the computing system 100A, 100B and/or decreased when a leisure application 218 is running on the computing system 100A, 100B. The backlight determiner 426 may, for example, determine that the intensity 208 should be increased when the user is logged into the computing system 100A, 100B and/or decreased when the user is logged into the computing system 100A, 100B via a personal account. The backlight determiner 426 may, for example, determine that the intensity 208 should be increased when the computing system 100A, 100B and/or backlight determiner 426 predicts, based on the user profile of the account logged into the computing system, that the user is unlikely to go to sleep soon and/or decreased when the computing system 100A, 100B and/or backlight determiner 426 predicts, based on the user profile of the account logged into the computing system, that the user is likely to go to sleep soon.

Predictions of when the user will go to sleep based on a user profile may be based on past interactions between the user and the computing system 100A, 100B while the user is logged in with the user profile, such as times when the user typically logs off of the computing system 100A, 100B and/or powers off the computing system 100A, 100B, applications that the user typically runs and/or websites that the user typically visits before logging off and/or powering off the computing system 100A, 100B, changes in typing patterns before the user typically logs off and/or powers off the computing system 100A, 100B, and/or in the context of a portable computing device, a location(s) of the computing system 100A before the user typically logs off and/or powers off the computing system 100A (such as a user going to sleep soon after using the computing system 100A near his or her bed), as non-limiting examples. The backlight determiner 426 may determine the intensity and/or color based on an angle of the lid 102 with respect to the base 104 based on angle input received from the computing system 100A in an example in which the computing system 100A is a portable computing device, such as by decreasing the intensity and/or shifting the color toward blue when the angle increases based on an expectation that when the user rotates the display 106A and/or lid 102 away from the base 104 he or she may be relaxing and more likely to go to sleep soon. The backlight determiner 426 may reduce intensity of the light based on received pressure on keys that is less than a threshold to process a character input indicating that the user's fingers are on the keys and therefore the keys do not need to be illuminated, and/or may reduce an illumination of a specific or first key based on the specific or first key having been actuated within a threshold time indicating that the user already knows where that specific or first key is. The backlight determiner 426 may, for example, determine the intensity 208 based on typing patterns of the user, such as decreasing the intensity based on the user typing the keys at a fast speed and/or increasing the intensity based on the user typing the keys at a slow speed.

The backlight determiner 426 may also cause the backlight(s) 120A, 120B to illuminate different keys with different intensities. For example, if the application running on the computing system 100A, 100B is an application for learning to type, the backlight determiner 426 may cause the backlight(s) 120A, 120B to illuminate a key that the user is supposed to type with a greater intensity than remaining keys. In an example in which the application running on the computing system 100A, 100B uses certain keys 302A, 302B, 302C, 302D including a first key more frequently than other keys 306 including a second key (such as directional keys in a gaming application), the backlight determiner 426 may cause the backlight(s) 120A, 120B to illuminate the certain keys 302A, 302B, 302C, 302D including the first key with a greater intensity than other keys 306 including the second key. In another example, the backlight determiner 426 may cause the backlight(s) 120A, 120B to illuminate a key(s) that received input more recently with greater intensity than keys that received input less recently, and/or illuminate a key that received input more recently than any other key with greater intensity than the other keys, so that the illumination of the keys follows the typing pattern.

Figure 5:
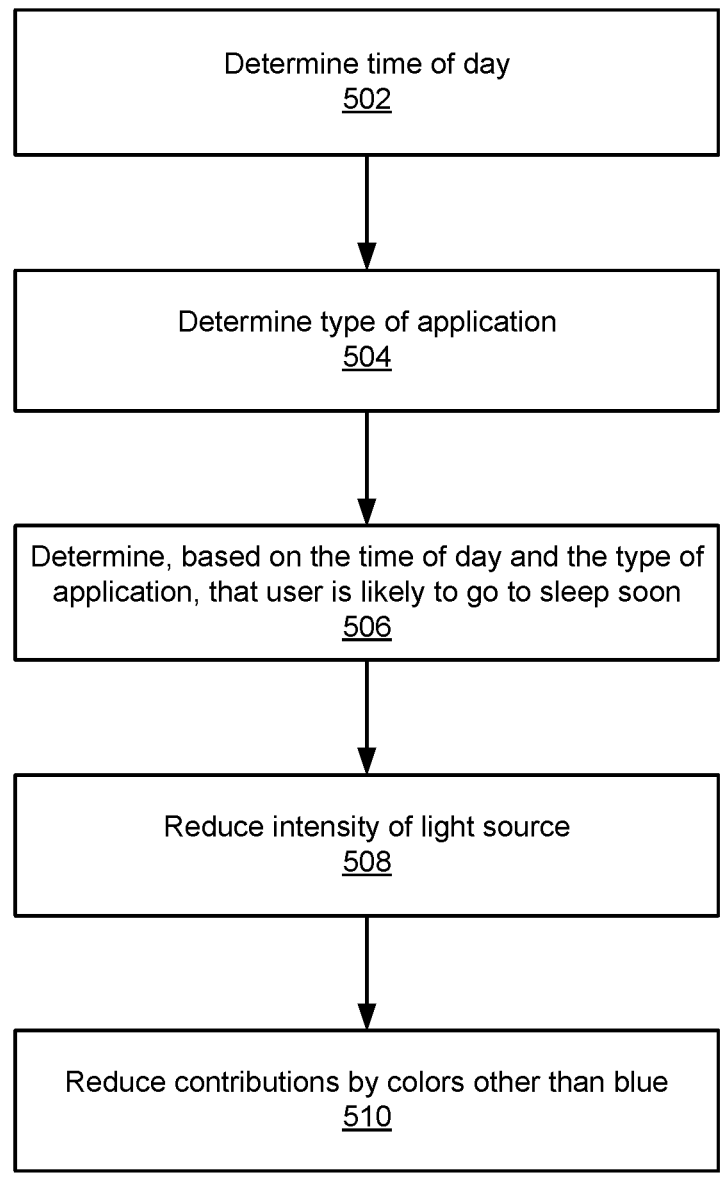
FIG. 5 is a flowchart of a method according to an example embodiment.

FIG. 5 is a flowchart of a method according to an example embodiment. The method may include determining, by a computing system 100A, 100B, a time of day (502). The method may also include determining a type of application running on the computing system 100A, 100B (504). The method may also include determining, based on the time of day and the type of application running on the computing system 100A, 100B, that a user of the computing system 100A, 100B is likely to go to sleep soon (506). The method may also include reducing an intensity of light source 120A, 120B for a keyboard 108A, 108B based on the determining that the user is likely to go to sleep soon (508). The method may also include reducing contributions of colors, other than blue, by the light source 120A, 120B for the keyboard 108A, 108B based on the determining that the user is likely to go to sleep soon (510).

According to an example, the determining that the user is likely to go to sleep soon (506) may be based on the time of day transitioning from working hours to evening hours.

According to an example, the determining that the user is likely to go to sleep soon (506) may be based on the type of application running on the computing system being a leisure application.

According to an example, the determining that the user is likely to go to sleep soon (506) may be based on an indication, by a user profile associated with an account logged into the computing system, that the user is likely to go to sleep soon after the determined time.

According to an example, the method may further include determining that a user account logged into the computing system is a personal account. In this example, the determining that the user of the computing system is likely to go to sleep soon may be based on the time of day, the type of application running on the computing system, and the user account being the personal account.

According to an example, the method may further include determining a typing pattern of input into the keyboard. In this example, the determining that the user of the computing system is likely to go to sleep soon may be based on the time of day, the type of application running on the computing system, and the typing pattern.

According to an example, the method may further include determining a frequency of input into the keyboard over a predetermined time period. In this example, the determining that the user of the computing system is likely to go to sleep soon may be based on the time of day, the type of application running on the computing system, and the frequency of input into the keyboard.

Figure 6:
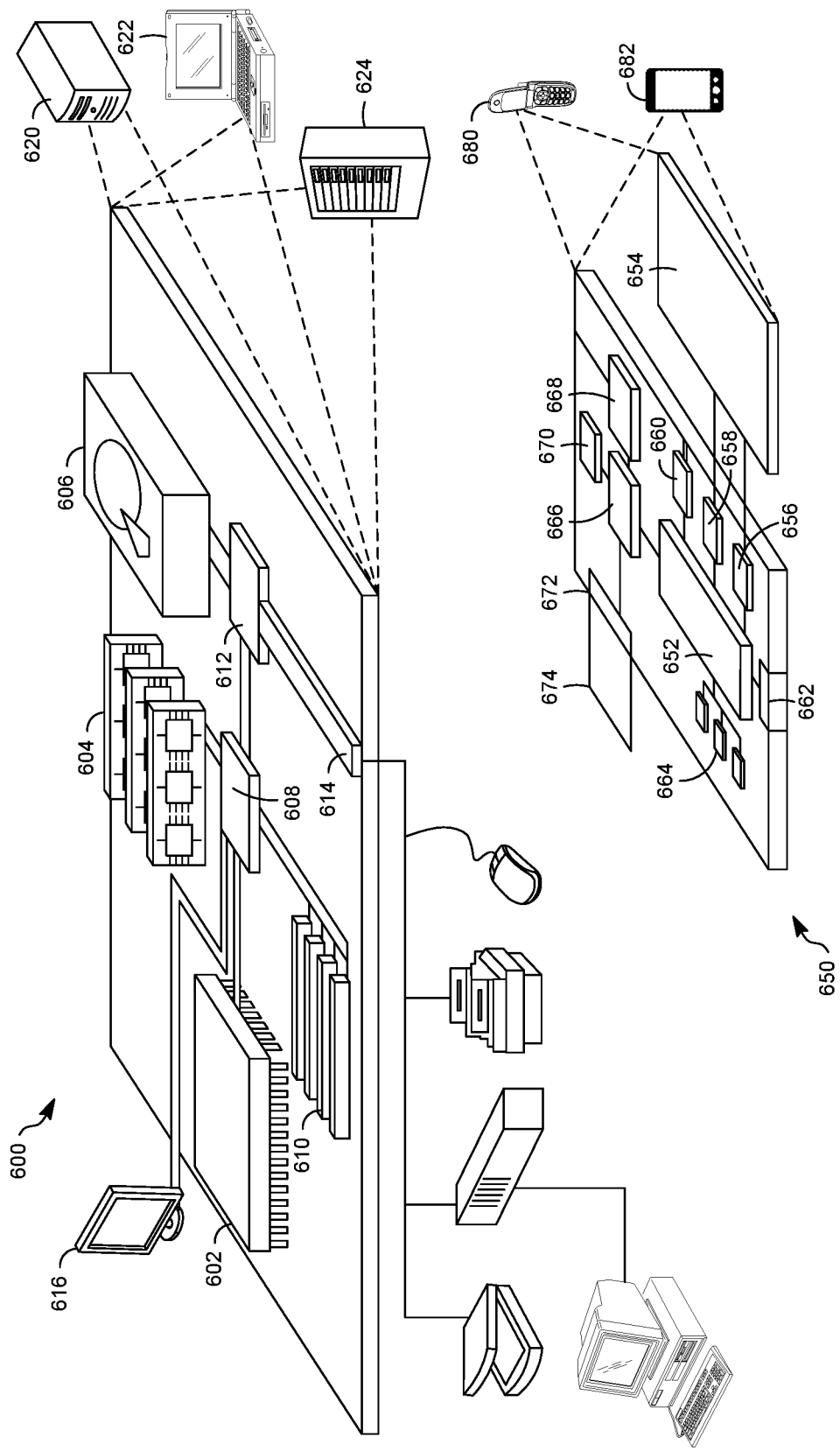
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, tablets, workstations, personal digital assistants, televisions, servers, blade servers, mainframes, and other appropriate computing devices. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A keyboard comprising:
a plurality of keys;
at least one light source configured to illuminate the plurality of keys; and
a controller configured to control an intensity of light emitted by the at least one light source based on a speed of typing into the keyboard,
the controller being configured to cause the intensity of the light, when an application identified as a productivity application is running on a computing system receiving input from the keyboard, to be higher than the intensity of the light when a leisure application is running on the computing system,
the productivity application including at least one of a word processing application, a spreadsheet application, or a presentation application,
the leisure application including at least one of a music player, a video player, a gaming application, or a web browser.

2. The keyboard of claim 1, wherein the controller is configured to process at least one signal to determine that a user is likely to go to sleep soon and control the at least one light source based on the at least one signal.

3. The keyboard of claim 1, wherein the controller is configured to cause the intensity of the light during hours identified as working hours to be higher than the intensity of the light during hours identified as evening hours.

4. The keyboard of claim 1, wherein the controller is configured to cause a color of the light during hours identified as working hours to have greater contributions from colors other than blue than during evening hours.

5. The keyboard of claim 1, wherein the controller is configured to control the intensity of the light based on a user profile associated with a user of the keyboard, the user profile indicating a predicted time duration before the user goes to sleep.

6. The keyboard of claim 1, wherein the controller is configured to:
reduce contributions from colors other than blue by the light source based on a user being logged into a personal account; and
increase contributions from colors other than blue by the light source based on the user being logged into a work account.

7. The keyboard of claim 6, wherein the keyboard is configured to reduce an intensity of the light source based on the user being logged into the personal account.

8. The keyboard of claim 1, wherein the controller is configured to decrease the intensity based on a user typing the keys at a fast speed.

9. The keyboard of claim 1, wherein the controller is configured to increase the intensity based on a user typing the keys at a slow speed.

10. The keyboard of claim 1, wherein:
the controller is configured to decrease the intensity based on a user typing the keys at a fast speed; and
the controller is configured to increase the intensity based on the user typing the keys at a slow speed.

11. The keyboard of claim 1, wherein the productivity application includes the word processing application.

12. The keyboard of claim 1, wherein the productivity application includes the spreadsheet application.

13. The keyboard of claim 1, wherein the productivity application includes the presentation application.

14. The keyboard of claim 1, wherein the leisure application includes the music player.

15. The keyboard of claim 1, wherein the leisure application includes the video player.

16. The keyboard of claim 1, wherein the leisure application includes the gaming application.

17. The keyboard of claim 1, wherein the leisure application includes the web browser.

18. A keyboard comprising:
a plurality of keys;
at least one light source configured to illuminate the plurality of keys; and
a controller configured to control an intensity of light emitted by the at least one light source based on a speed of typing into the keyboard,
the controller being configured to cause a color of the light, when a productivity application is running on a computing system receiving input from the keyboard, to have greater contributions from colors other than blue than when a leisure application is running on the computing system,
the productivity application including at least one of a word processing application, a spreadsheet application, or a presentation application,
the leisure application including at least one of a music player, a video player, a gaming application, or a web browser.

19. The keyboard of claim 18, wherein the productivity application includes the word processing application.

20. The keyboard of claim 18, wherein the leisure application includes the web browser.

* * * * *